United States Patent [19]

Mielke et al.

[11] Patent Number: 4,983,188
[45] Date of Patent: Jan. 8, 1991

[54] APPARATUS FOR RELIEVING A LOCK CHAMBER FOR ASH FROM PRESSURE

[75] Inventors: Horst Mielke, Neu Isenburg; Gerhard Schmitt, Schmitten; Peter Herbert, Frankfurt am Main, all of Fed. Rep. of Germany

[73] Assignee: Metallgesellschaft AG, Frankfurt am Main, Fed. Rep. of Germany

[21] Appl. No.: 495,240

[22] Filed: Mar. 16, 1990

[30] Foreign Application Priority Data

Apr. 11, 1989 [DE] Fed. Rep. of Germany ....... 3911752

[51] Int. Cl.$^5$ ................................................ C10J 3/72
[52] U.S. Cl. ...................................... 48/87; 55/385.4; 110/165 R; 414/221; 422/232
[58] Field of Search ........................... 48/87; 422/232; 414/221, 216, 147; 137/544; 55/385.4, 432; 110/165 R, 169

[56] References Cited

U.S. PATENT DOCUMENTS

| | | | |
|---|---|---|---|
| 2,375,436 | 5/1945 | Noock | 110/165 R |
| 2,834,665 | 5/1908 | Rudolph et al. | 414/221 |
| 3,266,226 | 8/1966 | Muller et al. | 55/432 |
| 4,032,311 | 6/1977 | Bohmuil et al. | 55/385.4 |
| 4,608,059 | 8/1986 | Kupfer et al. | 48/DIG. 10 |
| 4,728,250 | 3/1988 | Wilhelm et al. | 422/232 |
| 4,753,565 | 6/1988 | Reinert et al. | 414/221 |

Primary Examiner—Peter Kratz
Attorney, Agent, or Firm—Sprung Horn Kramer & Woods

[57] ABSTRACT

The lock container is connected to a reactor, which serves to gasify or to combust solid fuels. The lock container serves to remove ash from the reactor. A pressure of at least 2 bars prevails in the reactor. The lock container is pressurized and pressure-relieved in alternation. The pressure relief line communicates with a filter element, which is permeable to gas and substantially impermeable to solids and is disposed within the lock container. When the lock container is filled to the usual level during a pressure relief, at least one half of the filter element is surrounded by ash. The filter element may be tubular.

2 Claims, 1 Drawing Sheet

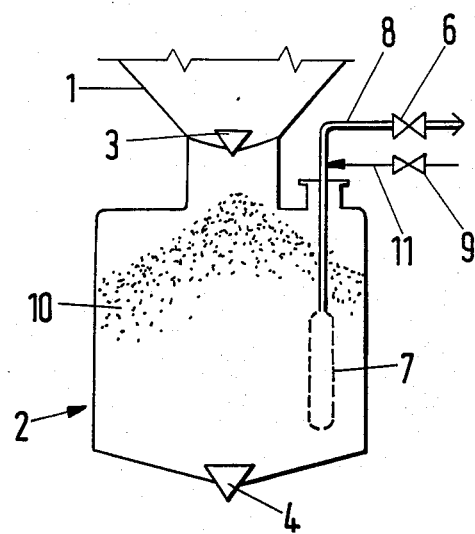

APPARATUS FOR RELIEVING A LOCK CHAMBER FOR ASH FROM PRESSURE

BACKGROUND OF THE INVENTION

This invention relates to a lock container, which communicates with a reactor, which is operated under a pressure of at least 2 bars and serves to gasify or combust solid fuels, which container serves to remove ash from the reactor and is pressurized and is relieved from pressure via a pressure relief line. The term "ash" usually describes solid residues, which may also contain carbon.

Such a lock container is known and has been described, e.g., in Published German Application No. 33 33 870 and in the corresponding U.S. Pat. No. 4,608,059. When the lock container has received ash from the reactor and must subsequently be relieved from pressure before it is emptied, considerable amounts of fine ash will be entrained by the gas flowing to a pressure relief. If a filter is incorporated in the pressure relief line, that filter will soon be clogged by the solids and will frequently have to be backpurged or replaced.

SUMMARY OF THE INVENTION

It is an object of the invention to ensure that the gas flowing to effect a pressure relief can leave the lock container freely during the longest possible operating time and that the maintenance work required for the filter will be minimized. This is accomplished in accordance with the invention in that the pressure relief line communicates with a filter element, which is permeable to gas and substantially impermeable to solids and is disposed within the lock container and at least one half of which is surrounded by ash during a relief of pressure when the lock container is filled to the usual level. In that case that portion of the filter element which is surrounded by the bed of ash during a pressure relief cannot or can hardly be clogged by finely divided ash because even finely divided ash contained in the bed will not be moved or will hardly be moved by the flowing gas. That reduced movability of the fine-grained ash is ensured by the coarse-grained fraction of the ash.

The filter element may be formed in various ways. The filter element is suitably tubular so that it may have a large surface and yet can be pulled out and inserted through a small opening in the lock container.

BRIEF DESCRIPTION OF THE DRAWING

Details of the lock container will be explained with reference to the drawing, which is a diagrammatic longitudinal sectional view showing the container.

DETAILED DESCRIPTION OF THE INVENTION

Solid fuels are gasified or combusted in a reactor 1 under a pressure of at least 2 bars. Only the lowermost portion of the reactor 1 is shown; that portion is succeeded by the lock container 2. A shut-off device 3 is provided between the reactor 1 and the container 2. When that shut-off device is open, it permits ash to flow from the reactor 1 into the container 2. The outlet of the lock container is also provided with a shut-off device 4.

In the FIGURE the lock container is shown in the state assumed shortly before or during the pressure relief. For a pressure relief, the valve 6 is opened so that gases can escape from the container through the filter element 7 and the pressure relief line 8. The valve 9 is closed. Because the filter element is entirely surrounded by the ash bed 10, the relatively coarse grains of ash prevent fine particles of ash from moving freely with the gas flowing to effect a pressure relief and from clogging the pores of the filter element 7. In order to produce that desirable result at least in part, the filter element 7 ius desirably so designed and arranged that at least one-half of its porous surface is surrounded by the ash bed. But the filter element is preferably disposed entirely or substantially in the ash bed.

When the lock container 2 has been relieved to atmospheric pressure, the shut-off device 4 is opened so that the ash can flow off. For the sake of precaution the pressure relief line 8 is connected to a line 11 so that water vapor or backpurging gas can be introduced into the filter element through the line 11 and the open valve 9 and the pores of the filter element 7 can be purged from the inside to the outside. But this will only rarely be required. In order to further decrease the frequency of purging operations it is recommended to connect a plurality of filter elements to the pressure relief line. The filter elements consist, e.g., of silicon carbide or heat-resisting mineral fibrous materials, inorganic filters, ceramic fibers or composite materials.

What is claimed is:

1. A lock container, communicating with a reactor operated under a pressure of at least 2 bars to gasify or combust solid fuels, the lock container arranged to remove ash from the reactor comprising a pressure relief line to effect pressurization and depressurization, a filter element in the container and in communication with the pressure relief line, wherein the filter element is permeable to gas and substantially impermeable to solids and is positioned within the lock container in such a location such that at least one half of the filter element is surrounded by ash during a relief of pressure with the lock container being filled with ash to a predetermined level.

2. The lock container according to claim 1, wherein the filter element is tubular.